United States Patent [19]

Cimarusti et al.

[11] Patent Number: 4,517,722
[45] Date of Patent: May 21, 1985

[54] BAR STOCK FEEDING TOOL

[76] Inventors: Robert J. Cimarusti, 2537 Wood St.; Stanley A. Posinger, 2521 N. Thatcher, both of Rivergrove, Ill. 60171

[21] Appl. No.: 543,044

[22] Filed: Oct. 18, 1983

[51] Int. Cl.³ .............................................. B23P 19/04
[52] U.S. Cl. ........................................ 29/234; 29/270; 81/484
[58] Field of Search .............. 81/3 R, 3.46 A; 29/234, 29/270

[56] References Cited

U.S. PATENT DOCUMENTS 2,670,641  3/1954  Corelle .................... 81/3.46 A

Primary Examiner—Roscoe V. Parker
Attorney, Agent, or Firm—Dick and Harris

[57] ABSTRACT

A tool apparatus for altering the geometric configuration of bar stock feeding equipment and for particularly opening the constraining end of the bar stock feeding conduit member for the purpose of removing, in a facilitated manner, the bar stock feed pads located within the conduit. A single integrated tool permits one individual, through either one or two hands, to position adjustable handle elements and prompting elements about and in the conduit member and to simultaneously enlarge prompting apertures in the conduit member about the conduit member's alteration slots. The handle elements may be spring loaded so as to automatically extend while it is prompted into position about the cylindrical periphery of the conduit member so as to further permit automatic snapping into place of the prompting elements within the respective prompting apertures. Through such a construction, safe and facilitated opening of the bar stock feeding conduit member is accomplished while permitting the freeing up of the user's hands to remove bar stock feed pads maintained within the conduit member, without requiring the assistance of another person.

9 Claims, 14 Drawing Figures

BAR STOCK FEEDING TOOL

BACKGROUND OF THE INVENTION

The present invention relates in general to automated machining apparata and particularly to a tool apparatus for altering the geometric configuration of bar stock feeding equipment for the purpose of removing replacing and/or interchanging bar stock feed pads located therewithin.

For a substantial number of years turret lathes, milling machines and the like have relied upon bar stock feeding equipment for the purpose of loading bar stock (usually of a metallic nature) into the machine for further machining operations. Such bar stock feeding equipment typically comprises, in the case of substantially cylindrically shaped bar stock, a bar stock feeding conduit member with feed pads located at its end portion which, by friction, grip the bar stock itself for subsequent feeding into the machining equipment. Due to wear on the bar stock feed pads within the bar stock feeding conduit member, these pads often have to be replaced. The only way in which such pads can be replaced, due to the conventional construction of such typical bar stock feeding equipment, is through the physical enlargement of the "feeding end" of the conduit member so as to provide enough space at the end of the conduit member for removal and/or replacement of the bar stock feed pads.

The alteration of the geometric shape of the bar stock feeding conduit member has typically been accomplished through the utilization of "Bayless" wrenches—individual wrenches which require an often difficult, contorted dual handled operation by a user attempting to enlarge the conduit member opening to release the feed pads. Indeed, over the years such wrenches have come to be known in the machine shop industry, affectionaly, as "knuckle busters".

Moreover, the utilization of such individual wrenches has often failed to provide the capability to the individual enlarging the conduit member, to remove the pads while maintaining the conduit member, for an extended period of time, in an "open" position. The two hands clutching the wrenches could not often be released to manually extricate the feed pads sought to be removed from the conduit member. Such prior art required, besides cumbersome, often dangerous manipulation of the tools, reliance upon the assistance of an additional individual to provide means for removing the feed pads once the conduit was opened and physically maintained "open" by the first individual, simultaneously.

It is thus an object of the present invention to provide an integrated tool which facilitates the operation of enlarging and opening the bar stock feeding conduit member so as to permit same to be done by one individual while enabling the same individual to remove the feed pads through "open position" maintenance features.

It is additionally an object of the present invention to provide such a bar stock feeding alteration tool which is simple in construction and inexpensive to manufacture.

A further object of the invention is the provision of an integrated tool which simultaneously opens both sides of the conduit member in close time ratio to one another so as to prevent jamming of feed pads, which could occur if one side of the conduit member is opened at a different rate than the other side. At the same time such a tool apparatus can automatically adjust to the circumferential dimensions of a myriad of conduit members as well as be adaptable to permit cooperation with bar stock feeding mechanisms of different size and configuration.

These and other objects of the inventions will become apparent in light of the present specification and drawings.

SUMMARY OF THE INVENTION

The present invention comprises a tool apparatus for altering the geometric configuration of bar stock feeding equipment and particularly for altering the diameter of bar stock feeding conduit members to in turn remove, in a facilitated manner, the bar stock feed pads located within the end of such conduit, to replace worn bar stock pads with new ones. Integrated handle means enable a consolidated leveraged operation of the tool apparatus by one user through said user's one hand, freeing one or both hands to be capable of removing the bar stock feed pads, as necessary, without the need for additional help.

The integrated handle has a first and second end opposite one another along the longitudinal axis of the integrated handle means. Pad release means are positioned at the first end of the integrated handle for cooperation with the pad maintenance features of the bar stock feeding conduit and particularly the bar stock feeding conduit alteration slots and prompting apertures which are typically provided to alter the geometric configuration of the bar stock feeding conduit member. These pad release means include substantially U-shaped tool forking means for simultaneously encircling the bar stock feeding conduit, to in turn position the pad release means at diametrically opposed positions adjacent the pad maintenance prompting apertures for insertion thereinto, towards the opening of the bar stock feeding means to alternatively open the bar stock feeding conduit, to maintain it in its open position, and to close the bar stock feeding conduit means once the bar stock feed pads have been replaced and/or interchanged.

The tool forking means emanate outwardly from the first side of the integrated handle and continue in the direction of the first side to describe an upper tine and a lower tine. The pad release means further include one or more eccentrically shaped prompting elements positioned along one or both of the upper tine (on the lower inner side) and the lower tine (at the upper inner side). Each of the eccentrically prompting elements are in substantial alignment along their respective longitudinal axis. As each of the prompting elements is positioned and shaped so as to be capable of insertion into the prompting apertures of the bar stock feeding conduit member, deformation of the conduit member along its specifically provided alteration slots is accomplished upon the pivoting of the tool apparatus through its integrated handle means about the axes described through the substantially aligned longitudinal axis of each of the one or more prompting elements. The simultaneous deformation of the prompting apertures and in turn the alteration slots serves to enlarge the end of the bar stock feeding conduit member to in turn enable loosening of the positions of the bar stock feed pads positioned within the endmost portion of the bar stock feeding conduit member to permit the removal, replacement and relocking of such bar stock friction pads from within the conduit member.

In the preferred embodiment of the invention the integrated handle means comprises two substantially aligned integrated handle elements, an upper portion element and a lower portion element, the distance between these aligned handle elements being variable. In this embodiment, each of the handle elements includes, at their respective first ends, integrally attached quarter-arc fork portions which enable the formation of the tool forking means upon the alignment of the upper and lower handle elements. These upper and lower integrated handle elements enable the fork portions to be adjustably moved closer and further apart to permit the tool apparatus to be adjustable for cooperation with bar stock feeding conduit members of varying diametric size and shape. In this preferred embodiment further, each of the upper and lower integrated handle portions are maintained in adjustable though restrained alignment relative to one another through the utilization of guide pin means positioned proximate to the first and second ends of each of the upper and lower integrated handle elements. Threaded handle fastening means are interposed between the upper and lower integrated handle portions for maintaining the handle portions in alignment while at the same time permitting the variable positioning or distancing of the elements relative to one another to permit the variable positioning of the upper and lower tines about the prompting apertures of the bar stock feeding conduit member, as well as to permit subsequent insertion of these prompting elements into respective ones of the prompting apertures.

In another embodiment of the invention the tool apparatus includes handle sleeve means surrounding each of the upper and lower integrated handle elements in a substantially continuous manner. The handle sleeve means includes spring biased prompting means such as a pair of spring members with one biasing each at the top and bottom positions, for respectively prompting the upper and lower handle elements inwardly towards one another to maintain them in a substantially juxtaposed position until utilized about the bar stock feeding conduit member. The spring biased prompting means yield to permit outward movement of the upper and lower handle portions upon the prompting movement of the pad release means against the bar stock feeding conduit member towards positioning the pad release means about and in the prompting apertures. The handle sleeve and spring biased prompting enables the automatic adjustment of the pad release means to position these pad release means, and particularly the eccentrically shaped prompting elements, about and into the prompting apertures on the conduit member by directing the pad release means about the substantially cylindrically shaped periphery of the bar stock feeding conduit member. This prompting automatically sizes and positions the prompting elements as well as automatically inserts such prompting elements under spring biased forced into their respective prompting apertures adjacent their positions along the upper and/or lower handle elements.

In the preferred embodiment, the eccentrically shaped prompting elements are of a substantially oval geometric shape, of such a size to be somewhat smaller than the larger oval shaped prompting apertures in the bar stock feeding conduit member so as to accommodate insertion of the smaller oval prompting element into such prompting apertures. Upon the pivoting of the overall tool apparatus through the integrated handle means, the elongated ends of the oval shaped prompting elements serves to prompt the innermost sides of the prompting aperture oval open by separating these innermost sides from one another to in turn prompt the opening of the bar stock conduit member along the conduit alteration slots. In an alternative preferred embodiment, the prompting elements, which are eccentrically shaped and emanating inwardly from the upper and lower tines, comprise multifaceted geometrically shaped prompting cams which are substantially oblong so as to permit entry of these cams into respective ones of the one or more prompting apertures while permitting the capability of rotation of such cams within the prompting apertures in either an upward or downward direction. Such rotation prompts the longitudinal sides of the prompting apertures outwardly from one another. In this particular embodiment the facets on the prompting cams serve to restrainably lock the longitudinal sides of the prompting apertures in its enlarged open position so as to enable release of the integrated handle means upon opening of the prompting aperture to its open position, to in turn enable the manual removal of the bar stock feed pads from the conduit member by the user's own hands without need for assistance from other individuals.

The invention, in its preferred embodiment contemplates a 90 degree pivotal rotation of the integrated handle means about the axis formed by the one or more prompting elements to open the prompting aperture from its substantially closed position to its completely open enlarged position to in turn facilitate the loosening of the bar stock friction feed pads from within the bar stock feeding conduit member towards removal, replacement and relocking of such feed pads in the conduit member.

As has been described, the prompting elements themselves are restrainably positioned along one or more of the inner tines to maximize the camming action in cooperation with the prompting aperture. Each of these prompting elements is contemplated as being removable and alternatively replaceable and inter changable within the upper and lower tines so as to permit the replacement of worn prompting elements as well as for replacing particularly configured prompting elements with one or more prompting elements of a different shape or configuration to accommodate the varying shape and sizes for various bar stock feeding conduit members and, for that matter, differently sized bar stock feeding equipment with alternative prompting apertures.

The particular construction for the prompting elements which cooperate with the upper and lower tines on the forking member, preferably, includes prompting elements comprising substantially oblong faceted camming members for insertion into the substantially larger oval shaped prompting aperture in the bar stock feeding conduit member. A substantially continuous collar is immediately adjacent this faceted cam element and shoulder means are adjacent the collar means for restrained placement of the overall prompting element assembly within an equivalently shaped shoulder opening within the one or more fork tines, which limit the telescopic receipt by such tines of the respective prompting elements. Shaft means are positioned adjacent the shoulder means for further telescopic receipt within an equivalently shaped region within the respective tine. Each said shaft means on each said prompting element is keyed on one side and the shaft region is equivalently keyed for aligned telescopic receipt of the shaft means to preclude the undesirable and inadvertent rotation of the shaft means and in turn the cam element within the shaft region in each said tine. The shaft region has associated therewith a threaded fastening element in alignment with the keyed portion of the shaft to further preclude rotation of the prompting element along its longitudinal axis and to further preclude the potential shifting of the prompting element relative to the forked tine while enabling repeated tightening and loosening of the threaded fastening element to permit removal, replacement and/or interchangability of a particular prompting element together with its associated shaft construction.

DETAILED DESCRIPTION OF THE DRAWINGS

Figure 1:
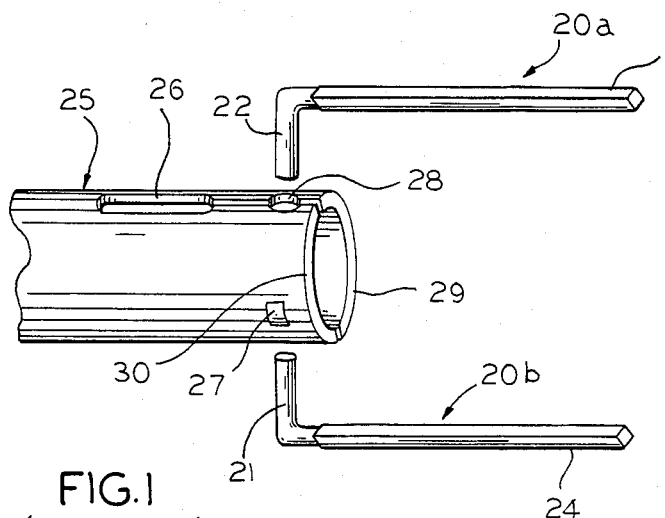
FIG. 1 of the drawings is a side perspective view of the prior art showing particularly utilization of prior art geometric configuration altering devices in a substantially exploded view about the ends of a bar stock feeding conduit member.

While this invention is susceptible of embodiment in many different forms, there is shown in the drawings and will herein be described in detail, two specific embodiments, with the understanding that the present disclosure is to be considered as an exemplification of the principles of the invention and is not intended to limit the invention to the embodiments illustrated.

Figure 2:
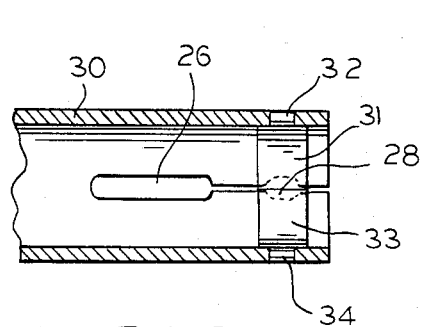
FIG. 2 is a front elevational view, in cross section, of a typical bar stock feeding conduit member together with the bar stock feed pads located therewithin and showing particularly the pad maintenance features associated therewith.
Figure 3:
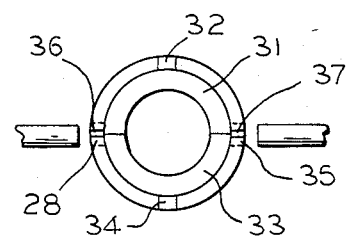
FIG. 3 is an elevational side view of a bar stock feeding conduit member with bar stock feed pads positioned therewithin immediately prior to insertion of typical prior art devices previously relied upon for altering the geometric configuration of the conduit member.

FIGS. 1 through 3 of the drawings set forth the prior art tooling which has been utilized in association with bar stock feeding equipment used in transferring bar stock material into lathes or other machining apparata. In FIG. 1 for example bar stock feeding conduit member 25 is shown with alteration slot 26, prompting aperture 28 and having alterable configured conduit ends 29 and 30. Such conventional bar stock feeding conduit members, such as conduit member 25 maintain a plurality of bar stock feed pads (as shown in FIG. 2) in which the top portion of one such feed pad emanates into feed pad aperture 27. While conduit 25 is in its closed configuration, bar stock feed pads such as feed pads 31 and 33 are maintained in place between conduit ends 29 and 30 in a position wholly within conduit 25 with the ends of such pads in substantially close abutment for tight fit therewithin. Prior art tools such as Bayless tool elements 23 and 24 have traditionally been utilized for insertion into prompting aperture 28 and then pivoted to alter the positioning of ends 29 and 30 to make capable the release of such feed pads from within conduit 25. In most such situations Bayless prompting tools 23 and 24 are each held in one hand of the user and then rotated either together in one direction, or in alternative directions to prompt open the conduit. In FIG. 2 feed pads 31 and 33 are shown in position within conduit 25 and particularly with cylindrically shaped conduit wall 30. Also shown are alteration slot 26 and prompting aperture 31 connected by a continuous slotted channel which is traditionally used in such feeding mechanisms to permit alteration of the shape of the conduit member to release pads 31 and 33 from their restrained position with feed pad protrusions 32 and 34 in respective feed pad apertures. Likewise in FIG. 3, pads 31 and 33 are shown together with feed pad members 32 and 34 respectively as are slotted portions 36 and 37 in the conduit as well as prompting apertures 28 and 35.

Figure 4:
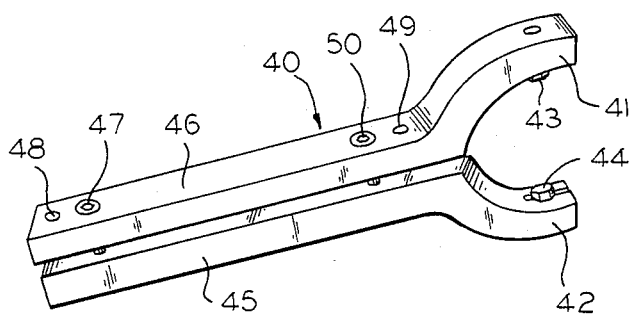
FIG. 4 is a top perspective view of one of two preferred embodiments of the present tool apparaus invention showing particularly the integrated handle means as well as the pad release means associated therewith.

One embodiment of the present invention is shown in FIG. 4 in which upper tool handle 46 and lower tool handle 45 are shown with respective emananting fork portions 41 and 42. Alignment pins 55 and 56 are positioned at the second and first ends respectively of the tool handles for communication therebetween as are threaded fastening means 47 and 50, which keep the handle segments from separating. Prompting elements 43 and 44 are shown in place within fork tines 41 and 42 respectively.

Figure 5:
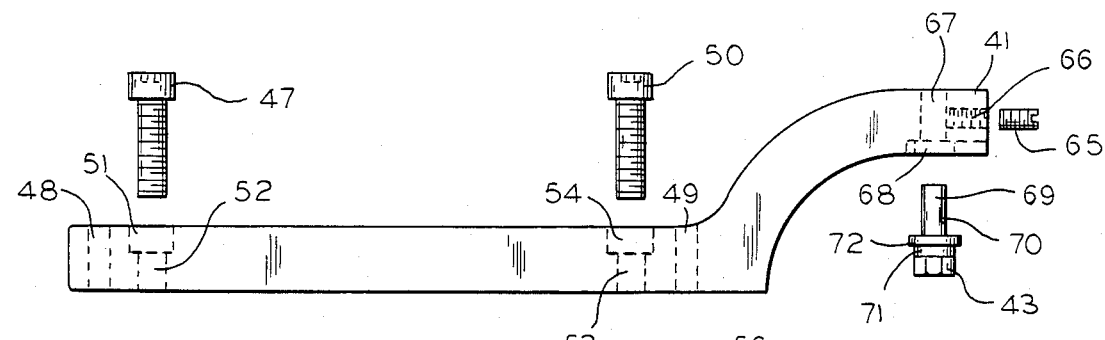
FIG. 5 is a front elevational exploded view of the tool apparatus invention of FIG. 4 showing particularly the structural elements thereof forming the integrated handle means, the pad release means as well as the alignment and fastening means associated therewith.
Figure 5:
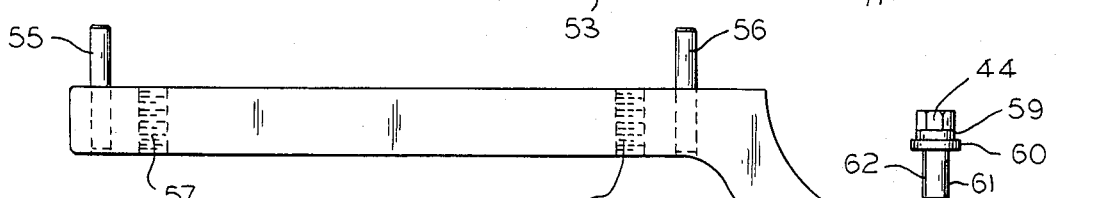

The tool apparatus of FIG. 4 is shown in FIG. 5 in greater detail in which tool apparatus 40 includes, within upper handle portion 46, guide pin apertures 48 and 49 for guide pins 55 and 56 as well as threaded receipt apertures 51-52 and 53-54 for telescopic receipt of threaded fasteners 47 and 50, which threadedly mate with threaded apertures 57 and 58 in lower handle portion 45. Through such a segmented handle construction, upper tine 41 and lower tine 42 possessing prompting elements 43 and 44, may be separated, in alignment, to diametrically surround the bar stock feeding conduit member and in turn be brought inwardly towards one another to permit entry of the prompting elements 43 and 44 into their aligned positions within the prompting apertures on the conduit member. Also shown in FIG. 5 as comprising portions of prompting elements 43 and 44 are collar means 59 and 71, shoulder means 60 and 72, as well as shaft means 62 and 69 with keyed portions 61 and 70 respectively for restrained, though removable, affixation to the forked tines within shoulder openings, such as shoulder opening 68, as well as shaft regions 49 and 67. Also shown are threaded fastening elements 64 and 65 which cooperate with the keyed portions 61 and 70 respectively on shafts 62 and 63, to maintain prompting elements 44 and 43, respectively, in position within tines 42 and 41.

Figure 6:
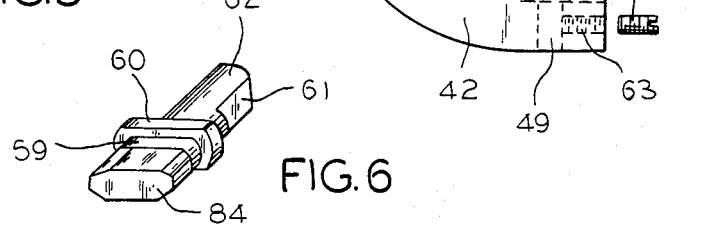
FIG. 6 is a top perspective view of a faceted prompting element showing particularly its fabricated construction for receipt by the upper and/or lower tines of the tool apparatus.

In FIG. 6 a close-up view of prompting element 44 is shown with faceted cam portion 84, collar means 59, shoulder means 60, shaft 62 and keyed shaft portion 61, for cooperation with the indented regions within tine 42 and subsequent telescopic receipt therewithin.

Figure 7:
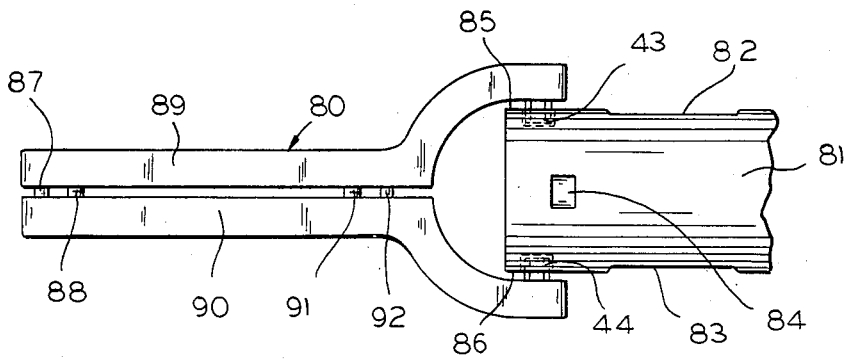
FIG. 7 is a front elevational view of the tool apparatus invention in position about a bar stock feeding conduit member, with said prompting elements in position within the prompting apertures of such conduit member, prior to the alteration of its geometric configuration.
Figure 8:
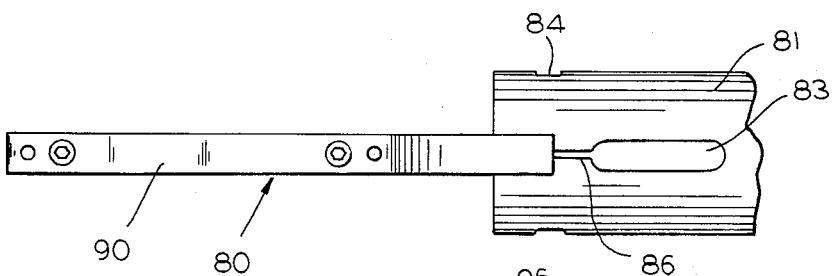
FIG. 8 is a top plan view of the tool apparatus of the present invention in place within the conduit member as previously shown in FIG. 7.

Tool apparatus 80 is shown in FIG. 7 in position about bar stock feeding conduit member 81 in which upper handle portion 89 with its associated upper tine and lower handle portion 90 with its associated lower tine, are positioned diametrically about conduit member 81 so as to place faceted prompting elements 43 and 44 emanating from the tines, into their respective prompting apertures. Tool apparatus 80 includes guide pins 87 and 92 as well as threaded handle fastening means 88 and 91 which cooperate to permit positioning of tool apparatus 80, as shown in FIG. 7, prior to its privoting through 90 degrees to open the prompting apertures. Also shown in FIG. 7 is feed pad member 84 and alteration slots 82 and 83 extending to the end of conduit 81 at side slots 85 and 86 respectively. Another view of the arrangement described relative to FIG. 7 above is shown in FIG. 8 wherein lower handle elements 90 of integrated handle means 80 is shown together with conduit member 81 and slots 83 and 86.

Figures 9, 11:
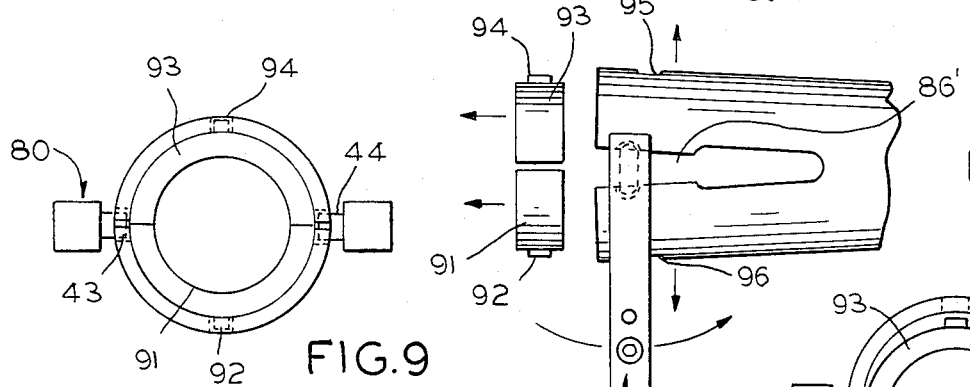
FIG. 9 is an elevated side view of the inventive tool apparatus of FIGS. 7 and 8 in place within said conduit member, showing particularly positioning of the fork tines and prompting elements within the prompting apertures of the conduit member as well as the positions of the feed pads within the conduit member.
FIG. 11 is a front elevational view of the tool apparatus after the apparatus has been pivoted 90 degrees to prompt, through the alteration slot, the configuration of the conduit member about its prompting apertures.

FIG. 9 shows prompting elements 43 and 44 in aligned respective prompting apertures in conduit 81 and particularly shows bar stock feed pad segments 93 and 91, having emanating pad elements 94 and 92, respectively.

Figure 12:
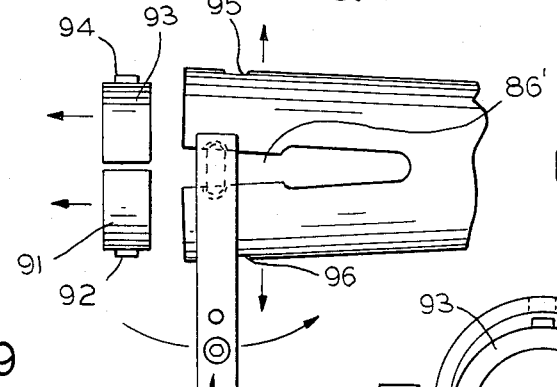
FIG. 12 is a side elevational view of the position of the tool apparatus relative to the bar stock feeding conduit member after alteration of its geometric configuration through pivoting of the tool apparatus through 90 degrees as shown in FIG. 11.
Figures 10, 13:
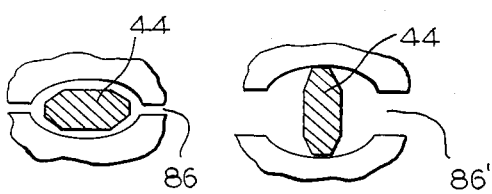
FIG. 10 is a front schematic view of a faceted prompting element within an oval shaped prompting aperture prior to pivoting of the prompting element towards ultimate enlargement of the oval to alter the configuration of the conduit member.
FIG. 13 is a front schematic view showing the prompting element affecting the geometric configuration of the conduit member, and showing the faceted member automatically locking into position in the "open" configuration in which the prompting aperture is enlarged so as to permit release of the integrated handle means for manual removal of the feed pads.

As shown in FIGS. 10 through 13, pivoting of the integrated handle of the present tool apparatus serves to automatically and simultaneously open both diametrically opposed prompting apertures. In FIG. 10 faceted prompting element 44 is shown in its respective prompting aperture proximate slot 86 in the "closed" position prior to the 90 degree pivoting of the tool by the user. Upon pivoting of the tool the arrangement shown by FIG. 11 occurs wherein alteration slot 86 as well as the associated prompting aperture opens through enlargement so as to alter the geometric configuration of the conduit member, to in turn enable removal of pads 91 and 93 outwardly from the conduit member. FIG. 11 also shows feed pad apertures 95 and 96 in which feed pads 93 and 91 with emanating elements 94 and 92 respectively reside, prior to removal. As can be seen in FIG. 12, alteration of the geometric configuration of conduit member 81 serves to release pads 91 and 93, which occurs after the pivoting of the tool apparatus through its integrated handle means which in turn drives prompting elements 43 and 44 to exert, at their longitudinal ends, pressure against the substantially oval shaped prompting aperture within the conduit to open same for release of the feed pads 91 and 93. In FIG. 13, a close-up view of the faceted prompting element 44 is shown after pivoting of the tool so as to enlarge both the aperture and its associated alteration slot 86'.

Figure 14:
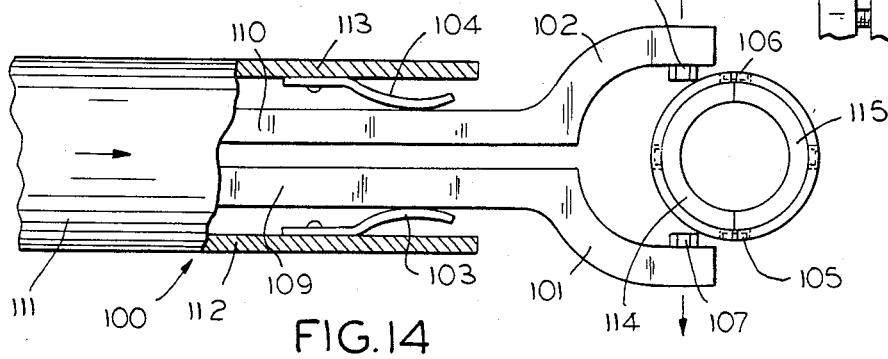
FIG. 14 is a front elevational view of a second embodiment of tool apparatus, partially in cross section, in which spring biasing means are utilized in association with each of the upper and lower handle elements to permit automatic positioning of the pad release means about the bar stock feeding conduit member as well as permitting automatic insertion of the prompting elements into the respective prompting apertures therefor.

A second embodiment of the tool apparatus is shown in FIG. 14 in which tool apparatus 100 includes upper and lower handle elements 110 and 109 respectively, which elements are sheathed in handle sleeve 111. Spring biased prompting means 103 and 104 emanate inwardly from sleeve portions 112 and 113 respectively so as to place a spring biased force inwardly on the aligned lower and upper handle segments 109 and 110. Such a construction permits automatic adjustment of the tool apparatus 100 upon contact of pad release means 102, 101, 108 and 107 with the substantially cylindrical shape of bar stock feeding conduit member, as shown in FIG. 14, wherein handle segments 110 and 109 with associated tines 102 and 101 will separate under spring bias until the diametrically opposed positions proximate to prompting apertures 106 and 105 are reached, at which time prompting elements 108 and 107 will automatically spring inwardly (upon repositioning of the handle in longitudinal alignment with the longitudinal axis of the conduit member). Upon appropriate operable insertion of prompting elements 107 and 108 in prompting apertures 105 and 106, respectively, the entire tool apparatus 100 can be rotated 90 degrees about the axis described by the prompting elements so as to, as described above, enlarge the alteration slots through the prompting apertures to permit facilitated release of bar stock feed pads 114 and 115.

The foregoing description and drawings merely explain and illustrate the invention and the invention is not limited thereto, except insofar as the amended claims are so limited, as those skilled in the art who have the disclosure before them will be able to make modifications and variations therein without departing from the scope of the invention.

What is claimed is:

1. A tool apparatus for altering the geometric configuration of bar stock feeding equipment and particularly the bar stock feeding conduit member, for the purpose of removing, in a facilitated manner, one or more of a plurality of bar stock feed pads located therewithin said conduit, said tool apparatus comprising:

integrated handle means for consolidated and leveraged operation of said tool apparatus through one or both hands of a user;

said integrated handle means having a first end, and a second end opposite to said first end along the longitudinal axis of said integrated handle means;

pad release means positioned at the first end of said integrated handle means for cooperation with pad maintenance features of said bar stock feeding conduit, said pad maintenance features including alteration slots and prompting apertures possessed by said bar stock feeding equipment;

said pad release means including substantially U-shaped tool forking means for simultaneously encircling said bar stock feeding means so as to position said pad release means at diametrically opposed positions adjacent said pad maintenance features for alternative insertion thereinto towards the opening of said bar stock feeding means, the facilitated maintenance of said bar stock feeding conduit in its said open position and the closing of said bar stock feeding conduit means to its closed position;

said tool forking means emanating outwardly from said first side of said integrated handle means to as to continue in the direction of said first side, to describe an upper tine and a lower tine;

said pad release means further including one or more eccentrically shaped prompting elements positioned along one or more of said lower inner side of said first upper tine and the upper inner side of said second lower tine in substantial longitudinal axial alignment of said prompting elements, each of said one or more prompting elements being positionable and shaped so as to be capable of insertion into the prompting apertures of said bar stock feeding conduit member so as to be capable of prompting deformation of said conduit member along its alteration slots upon the pivoting of said tool apparatus through said integrated handle means about an axis described through the substantially aligned longitudinal axis of each of the one or more prompting elements;

said simultaneous deformation serving to enlarge the end of said bar stock feeding conduit member to in turn enable the loosening of the positions of two or more bar stock feed pads positioned within the endmost portion of said bar stock feeding conduit member so as to permit the removal, replacement and relocking of such bar stock friction pads within said bar stock feeding conduit member.

2. The invention according to claim 1 in which said integrated handle means further comprises two substantially aligned integrated handle elements comprising an upper and lower handle portion, the distance between said aligned handle element being variable in position, each said handle element including, at their respective first ends, integrally attached quarter-arc fork portions so as to enable the formation of said tool forking means with said upper and lower tines upon the adjacent aligned positioning of said upper and lower handle elements, said separable upper and lower integrated handle elements enabling said fork portions to be adjustably moved closer and further apart so as to permit the overall tool apparatus to be adjustable for cooperation with bar stock feeding conduit member of varying diametric size and shape.

3. The invention according to claim 2 wherein each of said upper and lower integrated handle portions are maintained in adjustable though restrainably aligned position relative to one another through the utilization of guide pin means positioned proximate to the first and second ends of each of said upper and lower integrated handle elements; and threaded handle fastening means interposed between said upper and lower integrated handle portions for maintaining said handle portions in alignment while at the same time permitting said variable positioning of said elements to permit positioning of said upper and lower tines about the prompting apertures of said bar stock feeding conduit member and to permit subsequent insertion of said prompting elments into respective ones of said prompting apertures.

4. The tool apparatus according to claim 2 in which the invention further comprises handle sleeve means surrounding each of said upper and lower juxtaposed integrated handle elements in a substantially continuous manner;

said handle sleeve means including spring biased prompting means at a top and bottom position for respectively prompting the upper and lower handle elements inwardly towards one another so as to maintain same in a substantially juxtaposed position, said spring biased prompting means yielding to permit outward movement of said upper and lower handle portions upon the prompting movement of said pad release means against said bar stock feeding conduit member towards positioning about and in said prompting apertures;

said handle sleeve and said spring biased prompting means enabling the automatic adjustment of said pad release means to position same about and in turn in said prompting apertures through the directing of said pad release means about the substantially cylindrically shaped periphery of said bar stock feeding conduit member together with the automatic insertion, under said spring biased force, of said prompting elements positioned along said upper and lower tines into their respective prompting apertures within said bar stock feeding conduit member.

5. The invention according to claim 1 in which each of said one or more eccentrically shaped prompting elements is of a substantially oval geometric shape, each of said prompting apertures in said bar stock feeding conduit member having a substantially larger oval shape to accommodate insertion of the smaller oval shaped prompting elements;

the elongated ends of said oval shaped prompting elements serving to prompt, upon said pivoting, the inner most sides of said prompting aperture oval open by separating same from one another to in turn prompt opening of the bar stock feeding conduit member along said feeding conduit alteration slots.

6. The invention according to claim 1 in which each of said one or more eccentrically shaped promoting elements emanating inwardly from one or more of said upper and lower tines comprises a multifaceted, geometrically shaped promoting cam which is substantially oblong so as to permit entry of each of said cams into respective ones of said one or more prompting apertures in said bar stock feeding conduit member, said one or more prompting cams being rotatable in either an upward or downward direction to prompt the longitudinal sides of said respective prompting apertures outwardly from one another, said facets on said prompting cam serving to restrainably lock the longitudinal sides of said prompting aperture in its enlarged open position;

said capability of locking said prompting aperture into its open most enlarged position enabling manual removal of said bar stock feed pads therewithin said bar stock feeding conduit member without the need for assistance from another individual.

7. The invention according to claim 1 in which a 90 degree pivoting rotation of said integrated handle means about the axis formed by said one or more prompting elements serves to open said prompting aperture from its substantially closed position to its completely opened, enlarged position so as to facilitate the loosening of said bar stock friction feed pads from within said bar stock feeding conduit member towards said removal from, replacement into, and relocking of said bar stock feed pads in said bar stock feeding conduit member.

8. The invention according to claim 1 in which each of said one or more prompting elements is restrainably positioned along said one or more inner tine portions for effective camming action, in operation within said prompting aperture;

each of said one or more prompting elements being removable and alternatively replaceable and interchangeable within one or more of said upper and lower tines so as to permit the replacement of worn prompting elements, as is necessary, as well as for alternatively replacing one particular configuration of prompting elements with one or more prompting elements of a different configuration to accommodate varying shapes and sizes for various bar stock feeding conduit members and differently sized prompting apertures.

9. The invention according to claim 8 in which each of said one or more prompting elements comprises:

a substantially oblong faceted camming member for insertion into a substantially larger oval-shaped prompting aperture in said bar stock feeding conduit member;

substantially continuous collar means immediately adjacent said faceted cam element;

shoulder means adjacent the collar means for restrained placement of same within an equivalently shaped shoulder opening within each of said one or more fork tines to limit telescopic receipt by said tine of said respective prompting element;

shaft means adjacent said shoulder means for further telescopic receipt within an equivalently shaped shaft region within said respective tine;

said shaft means being keyed on one side and said shaft region being equivalently keyed for aligned telescopic receipt thereby to preclude the undesirable and inadvertent rotation of said shaft means and in turn said cam element within said shaft region in each said tine;

each said shaft region having associated therewith a threaded fastening element in alignment with the keyed portion of said shaft to further preclude rotation of said prompting element along its longitudinal axis and to further preclude the potential shifting of said prompting element relative to said fork tine.

* * * * *

UNITED STATES PATENT AND TRADEMARK OFFICE
CERTIFICATE OF CORRECTION

PATENT NO. : 4,517,722

DATED : May 21, 1985

INVENTOR(S) : Cimarusti, et al.

It is certified that error appears in the above-identified patent and that said Letters Patent is hereby corrected as shown below:

| | |
|---|---|
| Col. 1, line 34 | "handled" should be instead -- handed -- |
| Col. 5, line 33 | "apparaus" should be instead -- apparatus -- |
| Col. 6, line 58 | "with" should be instead -- within -- |
| Col. 7, line 34 | "63" should be instead -- 69 -- |
| Col. 10, line 58 | "promoting" should be instead -- prompting -- |
| Col. 10, line 61 | "promoting" should be instead -- prompting -- |

Signed and Sealed this

Twenty-fourth Day of December 1985

[SEAL]

Attest:

Attesting Officer

DONALD J. QUIGG

Commissioner of Patents and Trademarks